United States Patent
Lin et al.

(10) Patent No.: US 9,998,211 B2
(45) Date of Patent: Jun. 12, 2018

(54) PROTECTION SWITCHING METHOD, SYSTEM, AND APPARATUS FOR PASSIVE OPTICAL NETWORK

(71) Applicant: Huawei Technologies Co., Ltd., Shenzhen (CN)

(72) Inventors: Binchao Lin, Shenzhen (CN); Wei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 14/683,017

(22) Filed: Apr. 9, 2015

(65) Prior Publication Data
US 2015/0215033 A1    Jul. 30, 2015

Related U.S. Application Data

(63) Continuation of application No. PCT/CN2012/083086, filed on Oct. 17, 2012.

(51) Int. Cl.
*H04B 10/032* (2013.01)
*H04Q 11/00* (2006.01)
*H04B 10/27* (2013.01)

(52) U.S. Cl.
CPC ........... *H04B 10/032* (2013.01); *H04B 10/27* (2013.01); *H04Q 11/0067* (2013.01); *H04Q 2011/0081* (2013.01)

(58) Field of Classification Search
CPC .. H04B 10/032; H04B 10/27; H04Q 11/0067; H04Q 2011/0081

(Continued)

(56) References Cited

U.S. PATENT DOCUMENTS

2007/0263656 A1    11/2007 Niu et al.
2013/0259467 A1*   10/2013 Kang ................ H04Q 11/0067
                                                      398/5

FOREIGN PATENT DOCUMENTS

CN    101047445 A    10/2007
CN    101600128 A    12/2009
(Continued)

OTHER PUBLICATIONS

"Series G: Transmission Systems and Media, Digital Systems and Networks; Digital sections and digital line system—Optical line systems for local and access networks; ONT management and control interface specifications for B-PON system with protection features," ITU-T Telecommunication Standardization Sector of ITU, G.983.6, Jun. 2002, 22 pages.

(Continued)

*Primary Examiner* — Ricky Ngo
*Assistant Examiner* — Richard Chang
(74) *Attorney, Agent, or Firm* — Slater Matsil, LLP

(57) ABSTRACT

The present invention provides a protection switching method for a passive optical network. The method includes receiving, by an optical network unit ONU through each of two uplink passive optical network PON interfaces, an optical network terminal management and control interface OMCI message delivered by an OLT, where the OMCI message includes: configuration information on a work side and configuration information on a protect side; and processing, by the ONU by using each of two independent OMCI MIBs of the ONU, the OMCI message received by each of the two uplink PON interfaces, updating each of the two independent OMCI MIBs according to the OMCI message, and independently responding to the OMCI message.

20 Claims, 3 Drawing Sheets

(58) Field of Classification Search
USPC .......................................................... 398/2
See application file for complete search history.

(56) References Cited

FOREIGN PATENT DOCUMENTS

| CN | 101741474 A | 6/2010 |
|---|---|---|
| WO | 2007131430 A1 | 11/2007 |

OTHER PUBLICATIONS

"Series G: Transmission Systems and Media, Digital Systems and Networks; Digital sections and digital line system—Optical line systems for local and access networks; Gigabit-capable passive optical networks (GPON): General characteristics," ITU-T Telecommunication Standardization Sector of ITU, G.984.1, Mar. 2008, 39 pages.

"Series G: Transmission Systems and Media, Digital Systems and Networks; Digital sections and digital line system—Optical line systems for local and access networks; Gigabit-capable Passive Optical Networks (G-PON): ONT management and control interface specification," ITU-T Telecommunication Standardization Sector of ITU, G.984.4, Feb. 2008, 44 pages.

"Series G: Transmission Systems and Media, Digital Systems and Networks; Digital sections and digital line system—Optical line systems for local and access networks; Gigabit-capable passive optical networks (GPON): General characteristics; Amendment 1," ITU-T Telecommunication Standardization Sector of ITU, G.984.1 Amendment 1, Oct. 2009, 8 pages.

\* cited by examiner

PROTECTION SWITCHING METHOD, SYSTEM, AND APPARATUS FOR PASSIVE OPTICAL NETWORK

This application is a continuation of International Application No. PCT/CN2012/083086, filed on Oct. 17, 2012, which is hereby incorporated by reference in their entireties.

TECHNICAL FIELD

The present invention relates to the communications field, and in particular, to a protection switching method, system and apparatus for a passive optical network (PON).

BACKGROUND

A gigabit-capable passive optical network (GPON) system generally includes an optical line terminal (OLT) at a central office, an optical network unit (ONU) on a user side, and an optical distribution network (ODN), and uses a point-to-multipoint network structure. The ODN includes passive optical components, such as a single-mode optical fiber, an optical splitter, and an optical connector, and provides an optical transmission medium for a physical connection between the OLT and the ONU. According to different locations of an ONU in an access network, a GPON system may have several application types: fiber to the cabinet (FTTCab), fiber to the curb (FTTC), fiber to the building (FTTB), fiber to the home (FTTH), fiber to the business/office (FTTBiz/FTTO), and the like.

A diagram of protection switching networking of an existing GPON ONU is shown in FIG. 1. It should be noted that each ONU includes two uplink passive optical network (PON) interfaces, and the two interfaces are connected to two PON interfaces of an OLT by using different ODNs.

OLT: Both an active PON interface and a standby PON interface of an OLT are in a working state, the OLT needs ensure that service information of the active PON interface can be backed up to the standby PON interface in a synchronization manner, so that in a protection switching process, the standby PON interface can maintain that a service attribute of an ONU does not change.

Optical splitter: Two 1:N optical splitters are used.

ONU: Each ONU may separately use different PON MAC chips and different optical modules, and in a protection switching process of a PON interface, the ONU can maintain that a local service attribute does not change.

Both an active PON interface and a standby PON interface of an ONU are in a working state (that is, the ONU completes ONU registration, and standard and extended PLOAM message processing on two PON interfaces at the same time), and in a protection switching process of a PON interface, initialization configuration and service attribute configuration of the ONU do not need to be performed on the standby PON interface.

Both an ONU and an OLT detect a link status, and determine, according to the link status, whether to perform switching. If the OLT detects that an uplink of an active PON interface is faulty, the OLT automatically switches to a standby optical link, and notifies the ONU and requests switching by using a PST message through the standby optical link; and if the ONU detects that a downlink of an active PON interface is faulty, the ONU automatically switches to a standby optical link, and actively sends a PST message an OLT device to notify the OLT device that switching has been performed on the PON interface of the ONU and notify the OLT device of reasons of the switching, and to request switching.

Generally, an ONU merely maintains a set of OMCI MIB base inside, manages two access node interfaces (Access Node Interface, ANI) in this MIB base, cannot randomly perform an optical network terminal management and control interface (ONT Management and Control Interface, OMCI) management information base (Management Information Base, MIB) operation, and only can perform an OMCI operation on a current active PON interface, so as to avoid a problem of a MIB base operation conflict.

SUMMARY

Embodiments of the present invention provide a protection switching method, system, and apparatus for a passive optical network that allow an OMCI MIB operation to be randomly performed.

According to one aspect, the present invention provides a protection switching method for a passive optical network, where the method includes: receiving, by an optical network unit ONU through each of two uplink passive optical network PON interfaces, an optical network terminal management and control interface OMCI message delivered by an OLT, where the OMCI message includes: configuration information on a work side and configuration information on a protect side; and processing, by the ONU by using each of two independent OMCI MIBs of the ONU, the OMCI message received by each of the two uplink PON interfaces, updating each of the two independent OMCI MIBs according to the OMCI message, and independently responding to the OMCI message.

Optionally, the method further includes: receiving, by the ONU in an online restoration process, modification indication information sent by the OLT, and modifying, according to the modification indication information, a working ani-g pointer attribute and a protection ani-g pointer attribute in protection data protection data.

Optionally, each of the two uplink PON interfaces of the ONU supports a set of independent OMCI protocol stack, and maintains an OMCI MIB corresponding to each of the two uplink PON interfaces.

Optionally, the OMCI message received by each of the two uplink PON interfaces of the ONU comes from each of two downlink PON interfaces of a same OLT, or comes from each of two dual homed OLTs.

According to another aspect, a method for delivering an optical network terminal management and control interface OMCI message is provided, where the method includes: sending, by an OLT, an OMCI message to each of two uplink PON interfaces of an ONU, where the OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the method further includes: checking, by the OLT in an online configuration restoration process of the ONU, whether a working ani-g pointer attribute and a protection ani-g pointer attribute in protection data in the ONU match a work role and a protect role that are configured in an ONU on a current side; and if the working ani-g pointer attribute and the protection ani-g pointer attribute in the protection data in the ONU do not match the work role and the protect role that are configured in the ONU on the current side, delivering, to the ONU, an OMCI message that carries modification indication information, where the modification indication information is used to instruct the ONU to modify the working ani-g pointer attribute and the protection ani-g pointer attribute in the protection data.

Optionally, the method further includes: adding, by the OLT, an ONU to each of two downlink PON interfaces, and specifying a work role and a protect role to join a type C protection group, where each of two uplink PON interfaces of the ONU that support type C supports a set of independent OMCI protocol stack, and maintains an OMCI MIB base; and performing, by the OLT, service configuration for an ONU on the work side, and automatically synchronizing service configuration information on the work side to the protect side.

According to a next aspect, an optical network unit is provided, where the optical network unit includes: two uplink PON interfaces, each configured to receive an OMCI message delivered by an OLT, and send the OMCI message to each of two independent OMCI MIBs, where the OMCI message includes: configuration information on a work side and configuration information on a protect side; and the two OMCI MIBs, each configured to process the OMCI message received by each of the two uplink PON interfaces, update each of the two OMCI MIBs according to the OMCI message, and independently respond to the OMCI message.

Optionally, the uplink PON interface is further configured to receive, in an online restoration process, modification indication information sent by the OLT, where the modification indication information is used to instruct the ONU to modify a working ani-g pointer attribute and a protection ani-g pointer attribute in protection data protection data.

Optionally, each of the two uplink PON interfaces supports a set of independent OMCI protocol stack, and maintains an OMCI MIB corresponding to each of the two uplink PON interfaces.

Optionally, the OMCI message received by each of the two uplink PON interfaces comes from each of two downlink PON interfaces of a same OLT, or comes from each of two dual homed OLTs.

According to a next aspect, an optical line terminal is provided, where the optical line terminal includes: a sending unit, configured to send an OMCI message to each of two uplink PON interfaces of an ONU, where the OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the optical line terminal further includes: a checking and determining unit, configured to check, in an online configuration restoration process of the ONU, whether a working ani-g pointer attribute and a protection ani-g pointer attribute in protection data protection data in the ONU match a work role and a protect role that are configured in an ONU on a current side; and an indication unit, configured to acquire a determining result of the checking and determining unit; and when the determining result is that the working ani-g pointer attribute and the protection ani-g pointer attribute in the protection data in the ONU do not match the work role and the protect role that are configured in the ONU on the current side, deliver, to the ONU, an OMCI message that carries modification indication information, where the indication information is used to instruct the ONU to modify the working ani-g pointer attribute and the protection ani-g pointer attribute in the protection data.

According to a next aspect, a protection switching system for a passive optical network is provided, where the system includes: an optical line terminal OLT and an optical network unit ONU, where the OLT is connected to the ONU by using an optical distribution network ODN, and the ONU includes two uplink PON interfaces.

The OLT is configured to send an OMCI message to each of the two uplink PON interfaces of the ONU, where the OMCI message includes: configuration information on a work work side and configuration information on a protect side.

The ONU is configured to receive, through each of the two uplink PON interfaces, the OMCI message delivered by the OLT; process, by using each of two independent OMCI MIBs, the OMCI message received by each of the two uplink PON interfaces; update each of the two independent OMCI MIBs according to the OMCI message; and independently respond to the OMCI message.

Optionally, each of the two uplink PON interfaces of the ONU supports a set of independent OMCI protocol stack, and maintains an OMCI MIB corresponding to each of the two uplink PON interfaces.

Optionally, the OMCI message received by each of the two uplink PON interfaces of the ONU comes from each of two downlink PON interfaces of a same OLT, or comes from each of two dual homed OLTs.

According to a next aspect, an optical network unit is provided, where the optical network unit includes: two uplink PON interfaces and a processor.

The two uplink PON interfaces are each configured to receive an OMCI message delivered by an OLT, and send the OMCI message to each of two independent OMCI MIBs, where the OMCI message includes: configuration information on a work side and configuration information on a protect side; and the processor is configured to process the OMCI message received by each of the two uplink PON interfaces, update each of the two OMCI MIBs according to the OMCI message, and independently respond to the OMCI message.

Optionally, each of the two uplink PON interfaces supports a set of independent OMCI protocol stack, and maintains an OMCI MIB corresponding to each of the two uplink PON interfaces; and the OMCI message received by each of the two uplink PON interfaces comes from each of two downlink PON interfaces of a same OLT, or comes from each of two dual homed OLTs.

According to the last aspect, an optical line terminal is provided, where the optical line terminal includes a transmitter and a processor.

The transmitter is configured to send an OMCI message to each of two uplink PON interfaces of an ONU, where the OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the processor is further configured to check, in an online configuration restoration process of the ONU, whether a working ani-g pointer attribute and a protection ani-g pointer attribute in protection data protection data in the ONU match a work role and a protect role that are configured in an ONU on a current side; and when a checking result is that the working ani-g pointer attribute and the protection ani-g pointer attribute in the protection data in the ONU do not match the work role and the protect role that are configured in the ONU on the current side, deliver, to the ONU, an OMCI message that carries modification indication information, where the modification indication information is used to instruct the ONU to modify the working ani-g pointer attribute and the protection ani-g pointer attribute in the protection data.

The method provided in the present invention provides dual OMCI MIBs. Therefore, after the dual OMCI MIBs support dual OMCI protocol stacks in TYPE C, two uplink PON interfaces MAC of an ONU each maintain a MIB base. In this way, concepts of a work side and a protect side are weakened, that is, both the work side and the protect side need to separately maintain a MIB base, and in this way, whether a MIB is on the work side or the protect side does not need to be considered during switching. In addition, TYPE C configuration may differ from non-TYPE C configuration in software processing. A set of OMCI protocol stack code can be shared and no special processing is required for TYPE C, so that software complexity is reduced, and software can be well applied to hardware solutions of different ONUs for flexible configuration. In terms of service interruption time, because OMCI configuration restoration does not need to be performed on a new working PON interface after switching, good switching performance can be ensured for both TYPE C single homing and dual homing. The TYPE C dual homing can be more easily implemented in a manner of dual OMCI protocol stacks without a need to establish an internal interaction channel between two OLTs. An OLT better supports the TYPE C single homing and dual homing in a software implementation aspect, and a set of OMCI protocol stack code of the OLT can also be shared, thereby reducing complexity of software implementation.

DETAILED DESCRIPTION OF ILLUSTRATIVE EMBODIMENTS

To make the objectives, technical solutions, and advantages of the present invention clearer and more comprehensible, the following describes the present invention in further detail with reference to the accompanying drawings and embodiments. It should be understood that the specific embodiments described herein are merely used to explain the present invention but are not intended to limit the present invention.

An embodiment of the present invention provides a protection switching method based on an OMCI protocol stack, where the protection switching method is applicable to a passive optical network (PON) system, such as an asynchronous transfer mode passive optical network (ATM PON) system or a broadband passive optical network (BPON) system defined by the ITU-T G.983 series of standards, a gigabit-capable passive optical network (GPON) system defined by the ITU-T G.984 series of standards, or an XGPON system defined by the ITU-T G.987 series of standards. All content of various PON systems defined by the foregoing standards is incorporated herein by reference in its entirety.

Specifically, in an embodiment, the PON system may include at least one optical line terminal (OLT) located at a central office, multiple optical network units (ONU) distributed in a customer premise, and one or more optical distribution networks (ODN) used to perform data convergence/distribution between the at least one OLT and the multiple ONUs. An OLT is connected to multiple ONUs by using an ODN in a point-to-multipoint manner, and the OLT may manage and control an ONU through an optical network terminal management and control interface (OMCI). A direction from the OLT to the ONU is defined as a downlink direction, and a direction from the ONU to the OLT is defined as an uplink direction.

Figure 1:
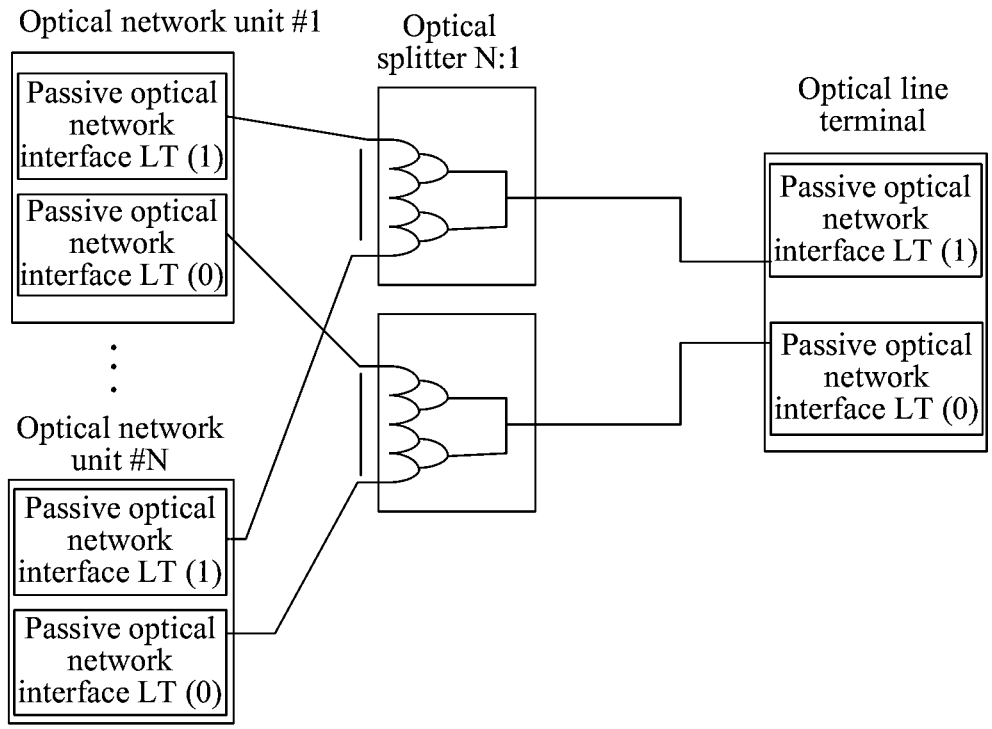
FIG. 1 is a diagram of TYPE C protection networking of a passive optical network.
Figure 2:
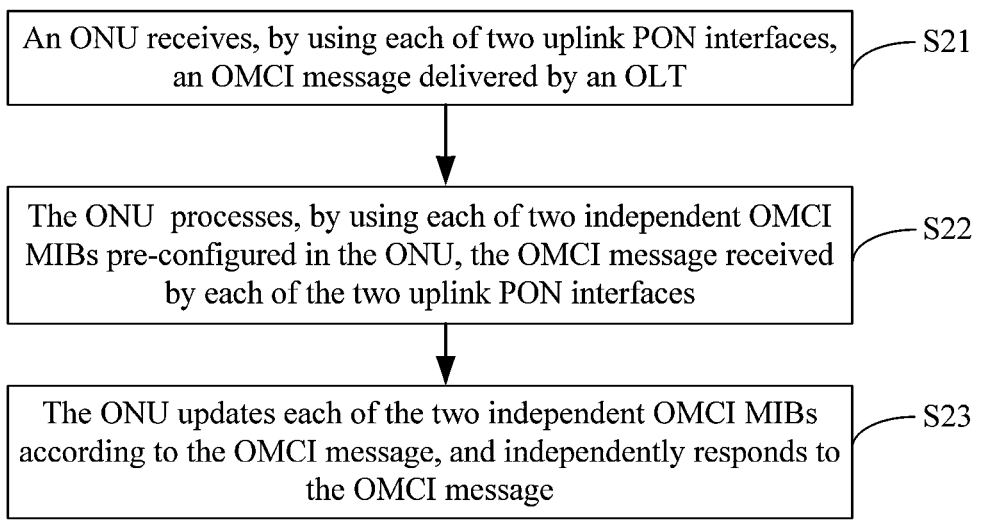
FIG. 2 is a flowchart of a protection switching method based on an OMCI protocol stack according to an embodiment of the present invention.

In an embodiment, each ONU includes two uplink PON interfaces, where each of two uplink PON interfaces of an ONU is connected to each of two downlink PON interfaces of an OLT by using different ODNs. A protection switching method for a passive optical network provided in an embodiment of the present invention may be executed by an ONU. As shown in FIG. 2, the method includes the following steps.

S21: An ONU receives, by using each of two uplink PON interfaces, an OMCI message delivered by an OLT, where the OMCI message includes: configuration information on a work side and configuration information on a protect side.

S22: The ONU processes, in each of two independent OMCI MIBs of the ONU, the OMCI message received by each of the two uplink PON interfaces.

S23: The ONU updates each of the two independent OMCI MIBs according to the OMCI message, and independently responds to the OMCI message.

The method provided in the present invention provides dual OMCI MIBs. Therefore, after the dual OMCI MIBs support dual OMCI protocol stacks in TYPE C, two uplink PON interfaces MAC of an ONU each maintain a MIB base. In this way, concepts of a work side and a protect side are weakened, that is, both the work side and the protect side need to separately maintain a MIB base, and in this way, whether a MIB is on the work side or the protect side does not need to be considered during switching. In addition, TYPE C configuration may differ from non-TYPE C configuration in software processing. A set of OMCI protocol stack code can be shared and no special processing is required for TYPE C, so that software complexity is reduced, and software can be well applied to hardware solutions of different ONUs for flexible configuration. In terms of service interruption time, because OMCI configuration restoration does not need to be performed on a new working PON interface after switching, good switching performance can be ensured for both TYPE C single homing and dual homing. The TYPE C dual homing can be more easily implemented in a manner of dual OMCI protocol stacks without a need to establish an internal interaction channel between two OLTs. An OLT better supports the TYPE C single homing and dual homing in a software implementation aspect, and a set of OMCI protocol stack code of the OLT can also be shared, thereby reducing complexity of software implementation.

Optionally, after S23, the foregoing method may further include receiving, by the ONU in an online restoration process, modification indication information sent by the OLT, and modifying, according to the modification indication information, a working ani-g pointer attribute and a protection ani-g pointer attribute in protection data protection data.

Optionally, each of the two uplink PON interfaces of the foregoing ONU supports a set of independent OMCI protocol stack, and maintains an OMCI MIB corresponding to each of the two uplink PON interfaces.

Optionally, the OMCI message received by each of the two uplink PON interfaces of the foregoing ONU comes from each of two downlink PON interfaces of a same OLT, or comes from each of two dual homed OLTs.

A specific implementation manner of the present invention further provides a delivering method based on an OMCI message, where the method includes sending, by an OLT, an OMCI message to each of two PON interfaces of an ONU, where the foregoing OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the foregoing method further includes checking, by the OLT in an online configuration restoration process of the ONU, whether a working ani-g pointer attribute and a protection ani-g pointer attribute in protection data (protection data) in the ONU match a work role and a protect role that are configured in an ONU on a current side; and if the working ani-g pointer attribute and the protection ani-g pointer attribute in the protection data in the ONU do not match the work role and the protect role that are configured in the ONU on the current side, delivering, to the ONU, an OMCI message that carries modification indication information, where the indication information is used to instruct the ONU to modify the working ani-g pointer attribute and the protection ani-g pointer attribute in the protection data.

This modification can increase a success rate of switching, because the working ani-g pointer attribute and the protection ani-g pointer attribute determine allocation for a work side and a protect side of the two PON interfaces of the ONU. The foregoing two attributes cannot be modified in the prior art, and in this case, if a work side and a protect side of the OLT are inconsistent with a work side and a protect side of the ONU, communication between the OLT and the ONU can only be implemented in a manner of manually replacing a connection cable in the prior art. The method provided in the present invention provides modifications of the foregoing two attributes, so that the OLT and the ONU can easily keep consistent in the work side and the protect side, thereby increasing a success rate of switching.

Optionally, after the OMCI message is sent to each of the two PON interfaces of the ONU or after the attributes are modified, the foregoing method may further include adding, by the OLT, an ONU to each of two downlink PON interfaces, and specifying a work role and a protect role to join a type C protection group, where each of two uplink PON interfaces of the ONU that support type C supports a set of independent OMCI protocol stack, and maintains an OMCI MIB base; and performing, by the OLT, service configuration for an ONU on the work side, and automatically synchronizing service configuration information on the work side to the protect side.

Figure 5:
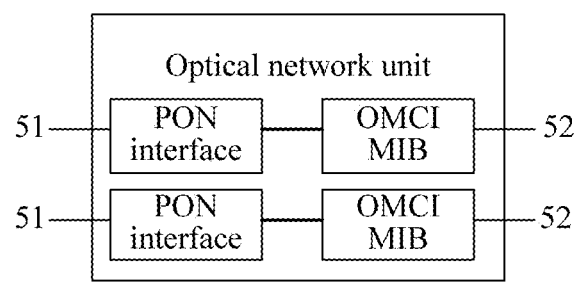
FIG. 5 is a structural diagram of an optical network unit according to a specific embodiment of the present invention.

A specific implementation manner of the present invention further provides an optical network unit. As shown in FIG. 5, the optical network unit includes two uplink PON interfaces 51, each configured to receive an OMCI message delivered by an OLT, where the OMCI message includes: configuration information on a work side and configuration information on a protect side; and send the OMCI message to each of two OMCI MIBs 52; and the two OMCI MIBs 52, each configured to process the OMCI message received by each of the two uplink PON interfaces, update each of the two OMCI MIBs according to the OMCI message, and independently respond to the OMCI message.

The optical network unit provided in the present invention provides dual OMCI MIBs. Therefore, after the dual OMCI MIBs support dual OMCI protocol stacks in TYPE C, two uplink PON interfaces MAC of the ONU each maintain a MIB base. In this way, concepts of a work side and a protect side are weakened, that is, both the work side and the protect side need to separately maintain a MIB base, and in this way, whether a MIB is on the work side or the protect side does not need to be considered during switching. In addition, TYPE C configuration may differ from non-TYPE C configuration in software processing. A set of OMCI protocol stack code can be shared and no special processing is required for TYPE C, so that software complexity is reduced, and software can be well applied to hardware solutions of different ONUs for flexible configuration. In terms of service interruption time, because OMCI configuration restoration does not need to be performed on a new working PON interface after switching, good switching performance can be ensured for both TYPE C single homing and dual homing. The TYPE C dual homing can be more easily implemented in a manner of dual OMCI protocol stacks without a need to establish an internal interaction channel between two OLTs. An OLT better supports the TYPE C single homing and dual homing in a software implementation aspect, and a set of OMCI protocol stack code of the OLT can also be shared, thereby reducing complexity of software implementation.

Optionally, the foregoing uplink PON interface is further configured to receive, in an online restoration process, modification indication information sent by the OLT, where the modification indication information is used to instruct the ONU to modify a working ani-g pointer attribute and a protection ani-g pointer attribute in protection data protection data.

Optionally, each of the two uplink PON interfaces supports a set of independent OMCI protocol stack, and maintains an OMCI MIB corresponding to each of the two uplink PON interfaces.

Optionally, the OMCI message received by each of the two uplink PON interfaces comes from each of two downlink PON interfaces of a same OLT, or comes from each of two dual homed OLTs.

Figure 6:
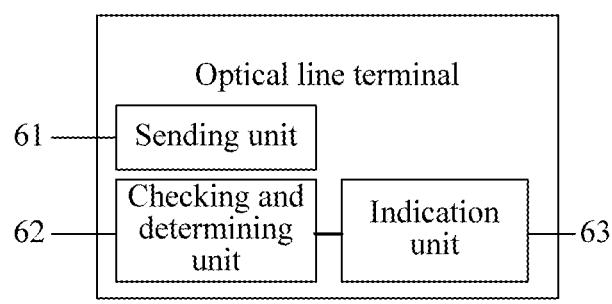
FIG. 6 is a structural diagram of an optical line terminal according to a specific embodiment of the present invention.

A specific implementation manner of the present invention further provides an optical line terminal, as shown in FIG. 6, the optical line terminal includes a sending unit 61, which is configured to send an OMCI message to each of two uplink PON interfaces of an ONU, where the OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the foregoing optical line terminal further includes a checking and determining unit 62, configured to check, in an online configuration restoration process of the ONU, whether a working ani-g pointer attribute and a protection ani-g pointer attribute in protection data in the ONU match a work role and a protect role that are configured in an ONU on a current side; and an indication unit 63, configured to acquire a determining result of the checking and determining unit; and when the determining result is that the working ani-g pointer attribute and the protection ani-g pointer attribute in the protection data in the ONU do not match the work role and the protect role that are configured in the ONU on the current side, deliver, to the ONU, an OMCI message that carries modification indication information, where the indication information is used to instruct the ONU to modify the working ani-g pointer attribute and the protection ani-g pointer attribute in the protection data.

A specific implementation manner of the present invention further provides a protection switching system for a passive optical network, where the system includes: an optical line terminal OLT and an optical network unit ONU, where the OLT is connected to the ONU by using an optical distribution network ODN, and the ONU includes two uplink PON interfaces.

The OLT is configured to send an OMCI message to each of the two uplink PON interfaces of the ONU, where the OMCI message includes: configuration information on a work work side and configuration information on a protect side.

The ONU is configured to receive, through each of the two uplink PON interfaces, the OMCI message delivered by the OLT; process, by using each of two independent OMCI MIBs, the OMCI message received by each of the two uplink PON interfaces; update each of the two independent OMCI MIBs according to the OMCI message; and independently respond to the OMCI message.

Optionally, each of the two uplink PON interfaces of the ONU supports a set of independent OMCI protocol stack, and maintains an OMCI MIB corresponding to each of the two uplink PON interfaces.

Optionally, the OMCI message received by each of the two uplink PON interfaces of the ONU comes from each of two downlink PON interfaces of a same OLT, or comes from each of two dual homed OLTs.

The system provided in the present invention provides dual OMCI MIBs. Therefore, after the dual OMCI MIBs support dual OMCI protocol stacks in TYPE C, two uplink PON interfaces MAC of an ONU each maintain a MIB base. In this way, concepts of a work side and a protect side are weakened, that is, both the work side and the protect side need to separately maintain a MIB base, and in this way, whether a MIB is on the work side or the protect side does not need to be considered during switching. In addition, TYPE C configuration may differ from non-TYPE C configuration in software processing. A set of OMCI protocol stack code can be shared and no special processing is required for TYPE C, so that software complexity is reduced, and software can be well applied to hardware solutions of different ONUs for flexible configuration. In terms of service interruption time, because OMCI configuration restoration does not need to be performed on a new working PON interface after switching, good switching performance can be ensured for both TYPE C single homing and dual homing. The TYPE C dual homing can be more easily implemented in a manner of dual OMCI protocol stacks without a need to establish an internal interaction channel between two OLTs. An OLT better supports the TYPE C single homing and dual homing in a software implementation aspect, and a set of OMCI protocol stack code of the OLT can also be shared, thereby reducing complexity of software implementation.

A specific implementation manner of the present invention further provides an optical network unit, where the optical network unit includes two PON interfaces and a processor.

Two uplink PON interfaces are each configured to receive an OMCI message delivered by an OLT, and send the OMCI message to each of two OMCI MIBs, where the OMCI message includes: configuration information on a work side and configuration information on a protect side; and the processor is configured to process the OMCI message received by each of the two uplink PON interfaces, update each of the two OMCI MIBs according to the OMCI message, and independently respond to the OMCI message.

The optical network unit provided in the present invention provides dual OMCI MIBs. Therefore, after the dual OMCI MIBs support dual OMCI protocol stacks in TYPE C, two uplink PON interfaces MAC of the ONU each maintain a MIB base. In this way, concepts of a work side and a protect side are weakened, that is, both the work side and the protect side need to separately maintain a MIB base, and in this way, whether a MIB is on the work side or the protect side does not need to be considered during switching. In addition, TYPE C configuration may differ from non-TYPE C configuration in software processing. A set of OMCI protocol stack code can be shared and no special processing is required for TYPE C, so that software complexity is reduced, and software can be well applied to hardware solutions of different ONUs for flexible configuration. In terms of service interruption time, because OMCI configuration restoration does not need to be performed on a new working PON interface after switching, good switching performance can be ensured for both TYPE C single homing and dual homing. The TYPE C dual homing can be more easily implemented in a manner of dual OMCI protocol stacks without a need to establish an internal interaction channel between two OLTs. An OLT better supports the TYPE C single homing and dual homing in a software implementation aspect, and a set of OMCI protocol stack code of the OLT can also be shared, thereby reducing complexity of software implementation.

Optionally, each of the two uplink PON interfaces supports a set of independent OMCI protocol stack, and maintains an OMCI MIB corresponding to each of the two uplink PON interfaces; and the OMCI message received by each of the two uplink PON interfaces comes from each of two downlink PON interfaces of a same OLT, or comes from each of two dual homed OLTs.

A specific implementation manner of the present invention provides an optical line terminal, where the optical line terminal includes a transmitter and a processor.

The transmitter is configured to send an OMCI message to each of two uplink PON interfaces of an ONU, where the OMCI message includes: configuration information on a work side and configuration information on a protect side; and the OMCI message is used to instruct the ONU to process, in each of two independent OMCI MIBs, the OMCI message received by each of the two uplink PON interfaces of the ONU, and update each of the two independent OMCI MIBs according to the OMCI message.

Optionally, the processor is configured to check, in an online configuration restoration process of the ONU, whether a working ani-g pointer attribute and a protection ani-g pointer attribute in protection data (protection data) in the ONU match a work role and a protect role that are configured in an ONU on a current side; and when a checking result is that the working ani-g pointer attribute and the protection ani-g pointer attribute in the protection data in the ONU do not match the work role and the protect role that are configured in the ONU on the current side, deliver, to the ONU, an OMCI message that carries modification indication information, where the modification indication information is used to instruct the ONU to modify the working ani-g pointer attribute and the protection ani-g pointer attribute in the protection data.

Figure 3:
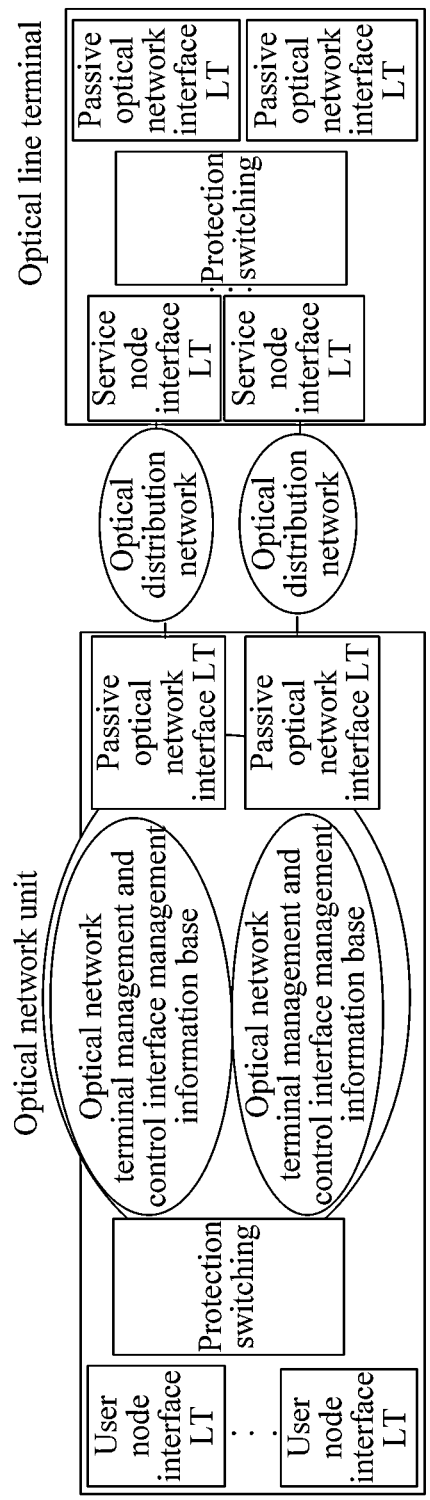
FIG. 3 is a diagram of a network structure of a technical scenario according to an embodiment of the present invention.

The present invention provides an embodiment, and this embodiment provides a protection switching method based on an OMCI protocol stack. A network structure of a technical scenario implemented in this embodiment is shown in FIG. 3, where the method includes the following features.

An OLT adds an ONU to each of two downlink PON interfaces, and specifies a work role and a protect role to join a typeC protection group.

The ONU supports two uplink PON interfaces of typeC, and each of the two PON interfaces supports a set of independent OMCI protocol stack and maintains an OMCI MIB base.

A user performs, on the OLT, service configuration for an ONU on a work side, and the service configuration includes T-CONT, GEMPORT, and the like. The OLT automatically synchronizes the service configuration information on the work side to a protect side, so as to ensure service configuration consistency between the two sides.

The OLT delivers, by using OMCI messages, configuration information on the work side and the protect side to the two uplink PON interfaces of the ONU, and each of the two PON interfaces of the ONU processes and responds to the OMCI message from the OLT, and updates, according to the OMCI message, an OMCI MIB maintained by each of the two PON interfaces.

The OLT checks, in an online configuration restoration process of the ONU, whether a working ani-g pointer attribute and a protection ani-g pointer attribute in protection data protection data (a data name in an OMCI MIB specified in the standards) match roles configured in an ONU on a current side; and if the working ani-g pointer attribute and the protection ani-g pointer attribute in the protection data do not match the roles configured in the ONU on the current side, sends an OMCI message to instruct the ONU to modify the working ani-g pointer attribute and the protection ani-g pointer attribute to be consistent with those of the OLT.

The two uplink PON interfaces MAC of the ONU are connected to two PON interfaces of the OLT, and exchange messages with the two PON interfaces of the OLT. For the OMCI messages delivered by the OLT, each of the two uplink PON interfaces of the ONU performs message processing by using an OMCI protocol stack of each of the two uplink PON interfaces, and maintains a local MIB base. It is not necessary to ensure that MIB bases of the two uplink PON interfaces are consistent. The OLT ensures OMCI configuration consistency between the two sides.

Figure 4:
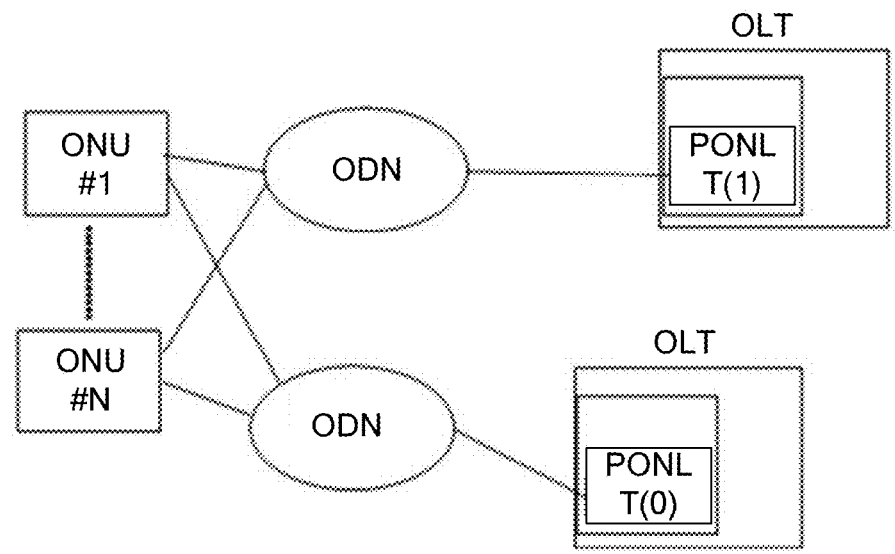
FIG. 4 is a diagram of a network structure of a technical scenario according to another embodiment of the present invention.

The present invention provides another specific embodiment, and this embodiment provides a protection switching method based on an OMCI protocol stack. A network structure of a technical scenario implemented in this embodiment is shown in FIG. 4, where the method includes the following steps.

An ONU supports two uplink PON interfaces of typeC, and each of the two uplink PON interfaces supports a set of independent OMCI protocol stack and maintains an OMCI MIB base.

Two OLTs that support dual homing each add an ONU to PON interfaces of the OLTs, specify an ONU located on a PON interface of an OLT(0) as a work role, specify an ONU located on a PON interface of an OLT(1) as a protect role, and add the two roles to a typeC protection group.

A user performs, on each of the OLTs, service configuration for an ONU on a work side, and the service configuration includes T-CONT, GEMPORT, and the like. The user or an upper-layer service provisioning system ensures configuration consistency between two sides (the work side and a protect side).

The two OLTs each deliver, by using OMCI messages, configuration information on the work side and the protect side to the two uplink PON interfaces of the ONU, and each of the two PON interfaces of the ONU processes and responds to the OMCI message from the OLT.

In an online configuration restoration process of the ONU, the OLT checks a protection data instance to determine whether a working ani-g pointer attribute and a protection ani-g pointer attribute match roles configured in an ONU on a current side; and if the working ani-g pointer attribute and the protection ani-g pointer attribute do not match the roles configured in the ONU on the current side, makes a modification.

The two uplink PON interfaces MAC of the ONU are connected to two PON interfaces of the OLT, and exchange messages with the two PON interfaces of the OLT. For the OMCI messages delivered by the OLT, each of the two uplink PON interfaces of the ONU performs message processing by using an OMCI protocol stack of each of the two uplink PON interfaces, and maintains a local MIB base. It is not necessary to ensure that MIB bases of the two uplink PON interfaces are consistent. A user or a system ensures consistency of configuration delivered to the OLT, and then the OLT delivers the configuration to the ONU.

In the foregoing unit and system embodiments, the module or unit division is merely logical function division, but the present invention is not limited to the foregoing division, as long as corresponding functions can be implemented. In addition, specific names of the functional modules are merely provided for the purpose of distinguishing the modules from one another, but are not intended to limit the protection scope of the present invention.

A person skilled in the art may understand that all or a part of the steps of the technical solutions in the embodiments of the present invention may be implemented by a program instructing relevant hardware. For example, implementation may be completed by using a computer to run the program. The program may be stored in a computer readable storage medium, such as a random access memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. A protection switching method for a passive optical network, wherein the method comprises:

receiving an optical network terminal management and control interface (OMCI) message delivered by an optical line terminal (OLT), the OMCI message received by an optical network unit (ONU) through each of two uplink passive optical network (PON) interfaces, wherein the OMCI message comprises configuration information on a work side and configuration information on a protection side;
processing the OMCI message received through each of the two uplink PON interfaces, the OMCI message being processed by the ONU using each of two independent OMCI management information bases (MIBs) of the ONU;
updating each of the two independent OMCI MIBs according to the OMCI message;
independently responding to the OMCI message; and
modifying, according to a received modification indication information, a working ani-g pointer attribute and a protection ani-g pointer attribute in protection data.

2. The method according to claim 1, wherein the method further comprises:
receiving, from the OLT, by the ONU in an online restoration process, the modification indication information; and.

3. The method according to claim 1, wherein each of the two uplink PON interfaces of the ONU supports a set of independent OMCI protocol stack and maintains an OMCI MIB corresponding to each of the two uplink PON interfaces.

4. The method according to claim 3, wherein the OMCI message received by each of the two uplink PON interfaces of the ONU comes from each of two downlink PON interfaces of the same OLT, or comes from each of two dual homed OLTs.

5. A method for delivering an optical network terminal management and control interface (OMCI) message, wherein the method comprises:
sending, by an optical line terminal (OLT) an OMCI message to each of two uplink passive optical network (PON) interfaces of an optical network unit (ONU) wherein the OMCI message comprises configuration information on a work side and configuration information on a protection side and wherein the OMCI message is used to instruct the ONU to process, in each of two independent OMCI management information bases (MIBs), the OMCI message received by each of the two uplink PON interfaces of the ONU, and to update each of the two independent OMCI MIBs according to the OMCI message; and
delivering, to the ONU, an OMCI message that carries modification indication information instructing the ONU to modify a working ani-g pointer attribute and a protection ani-g pointer attribute in protection data.

6. The method according to claim 5, wherein the method further comprises:
checking, by the OLT in an online configuration restoration process of the ONU, whether the working ani-g pointer attribute and the protection ani-g pointer attribute in protection data in the ONU match a work role and a protect role that are configured in an ONU on a current side; and
delivering, to the ONU, in response to the working ani-g pointer attribute and the protection ani-g pointer attribute in the protection data in the ONU not matching the work role and the protect role that are configured in the ONU on the current side, the OMCI message that carries the modification indication information.

7. The method according to claim 5, wherein the method further comprises:
adding, by the OLT, an ONU to each of two downlink PON interfaces;
specifying a work role and a protect role to join a type C protection group, wherein each of two uplink PON interfaces of the ONU that support type C supports a set of independent OMCI protocol stack, and maintains an OMCI MIB base;
performing, by the OLT, service configuration for the ONU on the work side; and
automatically synchronizing service configuration information on the work side to the protect side.

8. An optical network unit, comprising:
two uplink passive optical network (PON) interfaces, each configured to receive an optical network terminal management and control interface (OMCI) message delivered by an optical line terminal (OLT) and to send the OMCI message to each of two independent OMCI management information bases (MIBs), wherein the OMCI message comprises configuration information on a work side and configuration information on a protect side; and
the two OMCI MIBs, each configured to process the OMCI message received by each of the two uplink PON interfaces, to update each of the two OMCI MIBs according to the OMCI message, and to independently respond to the OMCI message;
wherein each of the two uplink PON interfaces are further configured to receive, from the OLT, modification indication information instructing an optical network unit (ONU) to modify a working ani-g pointer attribute and a protection ani-g pointer attribute in protection data.

9. The optical network unit according to claim 8, wherein each of the uplink PON interface is further configured to receive modification indication information in an online restoration process.

10. The optical network unit according to claim 8, wherein each of the two uplink PON interfaces supports a set of independent OMCI protocol stack and maintains an OMCI MIB corresponding to each of the two uplink PON interfaces.

11. The optical network unit according to claim 10, wherein the OMCI message received by each of the two uplink PON interfaces comes from each of two downlink PON interfaces of the same OLT, or comes from each of two dual homed OLTs.

12. An optical line terminal, comprising:
a transmitter; and
a processor, wherein the processor is configured to cause the transmitter to send an optical network terminal management and control interface (OMCI) message to each of two uplink passive optical network (PON) interfaces of an optical network unit (ONU), wherein the OMCI message comprises configuration information on a work side and configuration information on a protect side and the OMCI message is used to instruct the ONU to process, in each of two independent OMCI management information bases (MIBs), the OMCI message received by each of the two uplink PON interfaces of the ONU, and to update each of the two independent OMCI MIBs according to the OMCI message, and wherein the processor is further configured to deliver, to the ONU an OMCI message that carries modification indication information instructing the ONU to modify a working ani-g pointer attribute and a protection ani-g pointer attribute in protection data.

13. The optical line terminal according to claim 12, wherein the processor is further configured to:
check, in an online configuration restoration process of the ONU, whether the working ani-g pointer attribute and the protection ani-g pointer attribute in the protection data in the ONU match a work role and a protect role that are configured in an ONU on a current side;
deliver, to the ONU, the OMCI message that carries the modification indication information in response to the working ani-g pointer attribute and the protection ani-g pointer attribute in the protection data in the ONU not matching the work role and the protect role that are configured in the ONU on the current side.

14. A protection switching system for a passive optical network, wherein the system comprises:
an optical line terminal (OLT); and
an optical network unit (ONU) wherein the OLT is connected to the ONU by using an optical distribution network (ODN) and the ONU comprises two uplink passive optical network (PON) interfaces;
wherein the OLT is configured to send an optical network terminal management and control interface (OMCI) message to each of the two uplink PON interfaces of the ONU, wherein the OMCI message comprises configuration information on a work side and configuration information on a protect side; and
wherein the ONU is configured to receive, through each of the two uplink PON interfaces, the OMCI message delivered by the OLT, to process, by using each of two independent OMCI management information bases (MIBs), the OMCI message received by each of the two uplink PON interfaces, to update each of the two independent OMCI MIBs according to the OMCI message, and to independently respond to the OMCI message; and
wherein the OLT is further configured to deliver, to the ONU, an OMCI message that carries modification indication information instructing the ONU to modify a working ani-g pointer attribute and a protection ani-g pointer attribute in protection data.

15. The protection switching system according to claim 14, wherein each of the two uplink PON interfaces of the ONU supports a set of independent OMCI protocol stack and maintains an OMCI MIB corresponding to each of the two uplink PON interfaces.

16. The protection switching system according to claim 15, wherein the OMCI message received by each of the two uplink PON interfaces of the ONU comes from each of two downlink PON interfaces of the same OLT, or comes from each of two dual homed OLTs.

17. An optical network unit, comprising:
two uplink passive optical network (PON) interfaces, each configured to receive an optical network terminal management and control interface (OMCI) message delivered by an optical line terminal (OLT) and to send the OMCI message to each of two independent OMCI management information bases (MIBs), wherein the OMCI message comprises configuration information on a work side and configuration information on a protect side; and
a processor, configured to process the OMCI message received by each of the two uplink PON interfaces, to update each of the two OMCI MIBs according to the OMCI message, and to independently respond to the OMCI message;
wherein each of the two uplink passive PON interfaces are further configured to receive, from the OLT, modification indication information instructing an optical network unit (ONU) to modify a working ani-g pointer attribute and a protection ani-g pointer attribute in protection data.

18. The optical network unit according to claim 17, wherein each of the two uplink PON interfaces supports a set of independent OMCI protocol stack, and maintains an OMCI MIB corresponding to each of the two uplink PON interfaces; and
wherein the OMCI message received by each of the two uplink PON interfaces comes from each of two downlink PON interfaces of the same OLT, or comes from each of two dual homed OLTs.

19. An optical line terminal, comprising:
a transmitter; and
a processor, wherein the processor is configured to cause the transmitter to send an optical network terminal management and control interface (OMCI) message to each of two uplink passive optical network (PON) interfaces of an optical network unit (ONU), wherein the OMCI message comprises configuration information on a work side and configuration information on a protection side, and wherein the OMCI message is used to instruct the ONU to process, in each of two independent OMCI management information bases (MIBs), the OMCI message received by each of the two uplink PON interfaces of the ONU, and update each of the two independent OMCI MIBs according to the OMCI message, and wherein the processor is further configured to deliver, to the ONU an OMCI message that carries modification indication information instructing the ONU to modify a working ani-g pointer attribute and a protection ani-g pointer attribute in protection data.

20. The optical line terminal according to claim 19, wherein the processor is further configured to check, in an online configuration restoration process of the ONU, whether the working ani-g pointer attribute and the protection ani-g pointer attribute in the protection data in the ONU match a work role and a protect role that are configured in an ONU on a current side; and
deliver, to the ONU, the OMCI message that carries the modification indication information in response to the working ani-g pointer attribute and the protection ani-g pointer attribute in the protection data in the ONU not matching the work role and the protect role that are configured in the ONU on the current side.

* * * * *

UNITED STATES PATENT AND TRADEMARK OFFICE
CERTIFICATE OF CORRECTION

PATENT NO. : 9,998,211 B2
APPLICATION NO. : 14/683017
DATED : June 12, 2018
INVENTOR(S) : Binchao Lin It is certified that error appears in the above-identified patent and that said Letters Patent is hereby corrected as shown below:

In the Claims

In Column 13, Line 24, Claim 2, delete "; and".

Signed and Sealed this
Fourteenth Day of August, 2018

Andrei Iancu
*Director of the United States Patent and Trademark Office*